US009280957B1

(12) United States Patent
Chaves

(10) Patent No.: US 9,280,957 B1
(45) Date of Patent: Mar. 8, 2016

(54) SYSTEMS AND METHODS FOR PRACTICING STRINGED INSTRUMENTS

(71) Applicant: Chad Chaves, Eagan, MN (US)

(72) Inventor: Chad Chaves, Eagan, MN (US)

( * ) Notice: Subject to any disclaimer, the term of this patent is extended or adjusted under 35 U.S.C. 154(b) by 0 days.

(21) Appl. No.: 14/273,628

(22) Filed: May 9, 2014

Related U.S. Application Data

(60) Provisional application No. 61/821,631, filed on May 9, 2013.

(51) Int. Cl.
*G10D 3/06* (2006.01)
*G10D 3/14* (2006.01)

(52) U.S. Cl.
CPC ........................................ *G10D 3/14* (2013.01)

(58) Field of Classification Search
USPC ............................................................ 84/293
See application file for complete search history.

(56) References Cited

U.S. PATENT DOCUMENTS

| | | | | |
|---|---|---|---|---|
| 3,854,370 A | * | 12/1974 | Sapinski | 84/485 R |
| 4,024,787 A | * | 5/1977 | Larson | 84/743 |
| 4,031,801 A | * | 6/1977 | Cecchini | 84/465 |
| 5,756,914 A | * | 5/1998 | Streibl | 84/465 |
| 5,811,704 A | * | 9/1998 | Anderko | 84/470 R |
| 6,127,615 A | * | 10/2000 | Rosenberg | 84/465 |
| 7,230,175 B2 | * | 6/2007 | Whiteside | 84/465 |
| 7,262,354 B2 | * | 8/2007 | Orred et al. | 84/293 |
| 7,304,224 B1 | * | 12/2007 | Bettis et al. | 84/293 |
| D574,037 S | | 7/2008 | LeGrady et al. | |
| 8,124,863 B2 | * | 2/2012 | Van Wagoner | 84/293 |
| 8,618,398 B2 | * | 12/2013 | Van Wagoner et al. | 84/465 |
| 8,642,859 B1 | * | 2/2014 | Valenti | 84/293 |

* cited by examiner

*Primary Examiner* — Christopher Uhlir
(74) *Attorney, Agent, or Firm* — Underwood & Associates, LLC

(57) ABSTRACT

A practice system for a stringed instrument is disclosed. The practice system includes a rigid body having proximal end unto which one or more tuning pegs are disposed for attaching a first end of a cord, and a distal end until which a first rigid plate is disposed having one or more apertures therein configured for attaching a second end of said cord. The practice system further includes a second rigid plate fixedly attached to said proximal end having a first slot therein, and a second slot substantially matching said first slot disposed in said first rigid plate, wherein said first and said second slots cooperate to allow said practice system to be worn on a person by passing a fastening device therethrough.

13 Claims, 4 Drawing Sheets

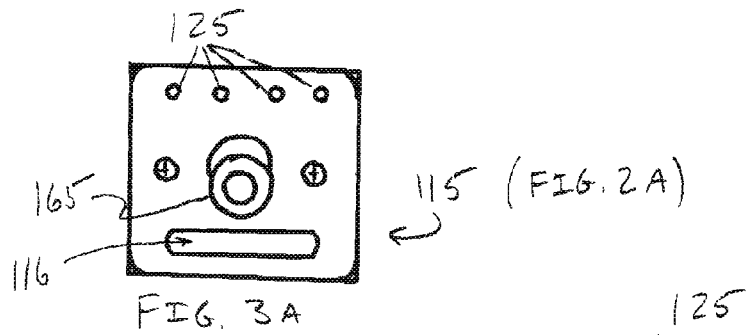
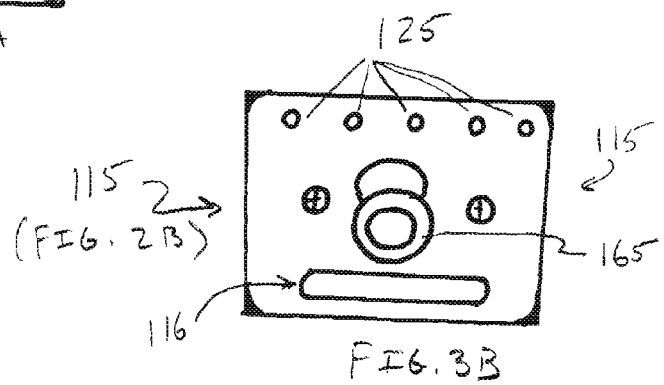
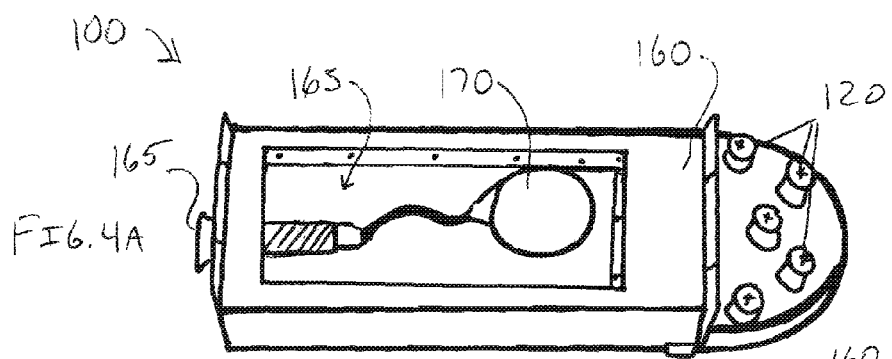
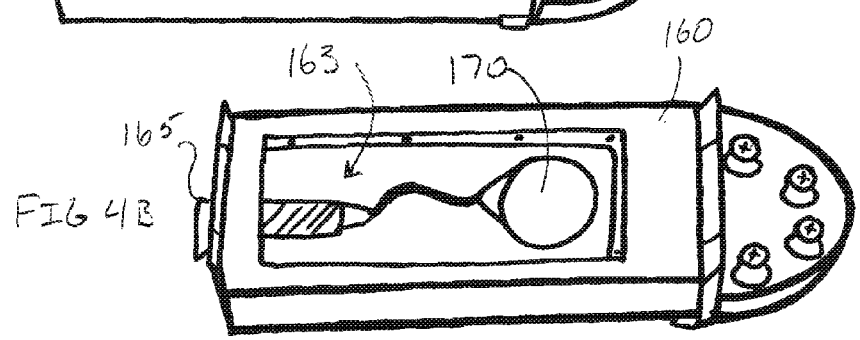

SYSTEMS AND METHODS FOR PRACTICING STRINGED INSTRUMENTS

CROSS REFERENCE TO RELATED APPLICATIONS

This application claims priority to and the benefit of U.S. Provisional Patent Application No. 61/821,631, filed on May 9, 2013, the entire contents of which are incorporated by reference in its entirety as if fully set forth herein.

TECHNICAL FIELD

This disclosure relates to systems and methods for practicing stringed instruments.

BACKGROUND

In general, a vast number and types of stringed instruments are known in the art. Exemplary stringed instruments include, without limitation, guitars, banjos, violins, ukuleles, cellos, lutes, and the like. Many stringed instruments generate tuned sounds by plucking, strumming, picking, or running an object such as a bow across a tensioned string, cord, or wire.

Musicians can learn to play a given stringed instrument using a variety of approaches. For example, students of the guitar may learn certain chords by placing the fingers of one hand along the neck in pre-determined locations so as to generate desired tones using a combination of appropriate string lengths, and strumming or picking strings with the other hand. Students of the violin, on the other hand, typically play single notes at a time by running a bow across a single (or sometimes double) string; the pitch of each string can be dynamically varied by appropriate placement of the student's fingers along the neck, or fingerboard.

SUMMARY

In general, mobile systems providing a practice platform for stringed instruments are disclosed. In one exemplary embodiment, a practice platform includes a body, which may be hollow or solid as desired. The platform further includes a bridge at a distal platform end, and at least one tuning peg at a proximal platform end, and at least one string, wire, or cord attached therebetween. In one embodiment, the practice platform includes a plurality of tuning pegs and a bridge that is configured to accommodate a plurality of strings that is equal to the number of tuning pegs provided. In one embodiment, the platform can be hollow, to accommodate electronic amplification components such as pick-ups and the like. In one embodiment, the platform is configured to be approximately 1.5 times to 2 times the width of an average human hand. In one embodiment, the platform can be configured to be attached to a person, e.g., through the use of a belt or accessory loop of strapping material. In this way, a practitioner can use the platform with one hand, e.g., to practice picking and the like. In general, practice platforms of the type described herein can be tuned according to preference or to provide desired feel or characteristic.

In one exemplary aspect, a practice system for a stringed instrument is disclosed. The practice system includes a rigid body having proximal end unto which one or more tuning pegs are disposed for attaching a first end of a cord, and a distal end unto which a first rigid plate is disposed having one or more apertures therein configured for attaching a second end of the cord. The practice system further includes a second rigid plate fixedly attached to the proximal end having a first slot therein, and a second slot substantially matching the first slot disposed in the first rigid plate, wherein the first and said second slots cooperate to allow the practice system to be worn on a person by passing a fastening device therethrough.

In one exemplary aspect, a practice system for a stringed instrument is disclosed. The practice system includes a rigid body having a proximal end unto which one or more tuning pegs are disposed for attaching a first end of a cord, and a distal end unto which a first rigid plate is disposed having one or more apertures therein configured for attaching a second end of the cord. The practice system further includes a second rigid plate coupled to the proximal end which has a first slot therein, and a second slot substantially matching the first slot disposed in the first rigid plate. The first and said second slots are configured to receive a portion of a fastening device such as a belt therethrough for wearing the practice instrument on a person.

In one embodiment, the rigid body has a length dimension less than about nine (9) inches. In a related embodiment, the rigid body has a width dimension less than about five (5) inches.

In one embodiment, the first and said second slots are configured to receive a belt.

In one embodiment, the practice system includes four (4) of tuning pegs, four (4) apertures in the rigid plate, and one (1) cord spanning each tuning peg/aperture pair. In a related embodiment, the cords are capable of being tuned by the tuning pegs to produce a desired musical note when played.

In one embodiment, the practice system is configured to allow a practitioner to tune the cord to a desired musical tone.

In one embodiment, the practice system further includes one or more frets disposed on the rigid body between the tuning pegs and the first rigid plate which are configured to allow a practitioner to change the tonal characteristic of the cord when played.

In one embodiment, the practice system further includes a recess in the rigid body for at least one electronic component which is configured to amplify sound originating from the cord when played. In a related embodiment, the electronic component is a pick-up amplifier. In another related embodiment, the practice system further includes at least one electronic component for transmitting the sound to an output jack. In yet another related embodiment, the output jack is configured to receive a headphone jack. In yet another related embodiment, the practice system further includes a recess in the rigid body for receiving a battery capable of powering the electronic component, and circuitry for connecting the battery to the electronic component.

In one exemplary aspect, a wearable system for practicing a stringed instrument is disclosed. The system includes a rigid body rotatably coupled to a wearable clip member. The rigid body includes one or more tensioned strings, each spanning a rigid plate member disposed on a proximal portion of the body and a tuning peg disposed on a distal portion of the body in a guitar-like configuration.

In one embodiment, the wearable clip is configured to be coupled to a belt. In a related embodiment, a top portion of the rigid body is hingedly coupled to a top portion of the wearable clip such that a bottom portion of the rigid body can be shifted away from a bottom portion of the wearable clip. In a related embodiment, the wearable system further includes at least one arm member configured to reversibly fix the rigid body at a desired angle relative to the wearable clip. In yet another related embodiment, the wearable system further includes a first arcuate arm coupled to the rigid body, and a second arcuate arm coupled to a plate member of the wearable clip. The first and said second arcuate arms are configured to slidably translate over one another; and the first and second arcuate arms include a slot for receiving a locking member that locks the first and the second arcuate arm in a desired position relative to each other.

In one embodiment, the system has a length less than about nine (9) inches and a width of less than about five (5) inches.

In one exemplary aspect, a method is disclosed. The method includes providing an elongate rigid body member having proximal and distal end portions and a length of less than about nine (9) inches and a width of less than about five (5) inches. The method further includes providing one or more plates on the proximal end of the rigid body member configured for receiving and securing one or more strings in a linear order, and providing a complimentary number of tuning pegs on the distal end portion of the rigid body for each of the strings disposed such that each of the strings is parallel to each other. The method further includes providing means for attaching the elongate rigid body member to an article of clothing or to a strap that is configured to secure the rigid body member to a person.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which:

FIGS. 3A-3B illustrate a bridge portion of a practice platform according to one embodiment;

FIGS. 4A-4B illustrate a body portion of a practice platform having a chamber portion for receiving an electronic component.

DETAILED DESCRIPTION OF ILLUSTRATIVE EMBODIMENTS

In one exemplary aspect, practice platforms for the practice of stringed instruments are provided. As used herein, the term "stringed instruments" can include any type of stringed instrument known in the art, including, but not limited to: guitars, banjos, ukuleles, violins, bases, mandolins, lutes, and the like.

Figure 1:
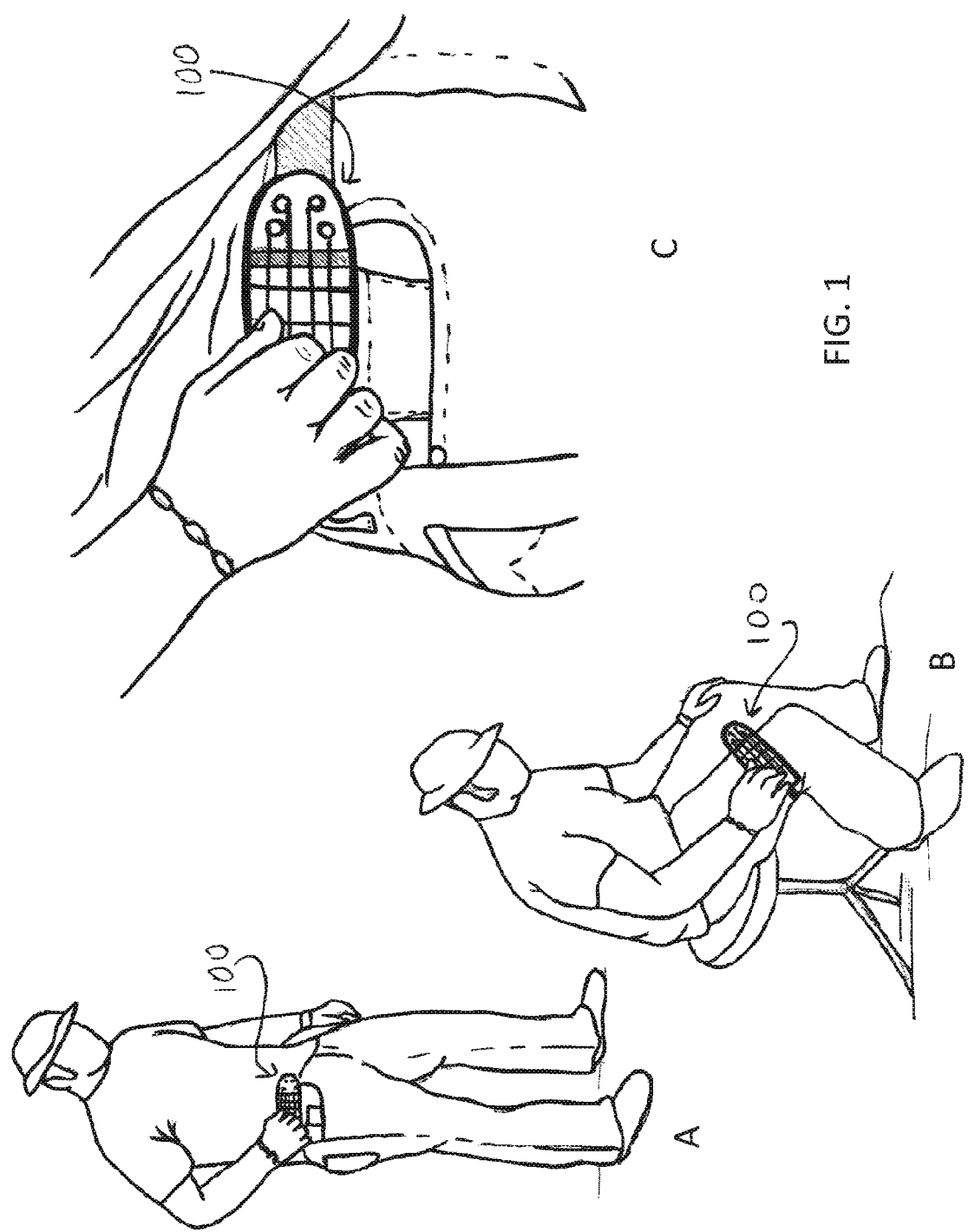
FIG. 1 illustrates use of a practice platform according to one embodiment.

Referring now to FIGS. 1 and 2, a practice platform 100 (hereinafter 'platform') is illustrated according to one embodiment. As described in greater detail herein, the practice platform 100 can be worn on a person's body in a selected area through use of a variety of connection devices. For example, FIG. 1(A) illustrates the platform 100 being worn on a person's hip by attaching the platform to a belt. FIG. 1(B) illustrates the platform 100 being worn on a person's thigh through the use of an accessory belt (not shown in FIG. 1(B) for clarity). FIG. 1(C) is a close-up illustration of the platform 100 shown in FIG. 1(A), as attached to the practitioner's belt.

Figure 2A:
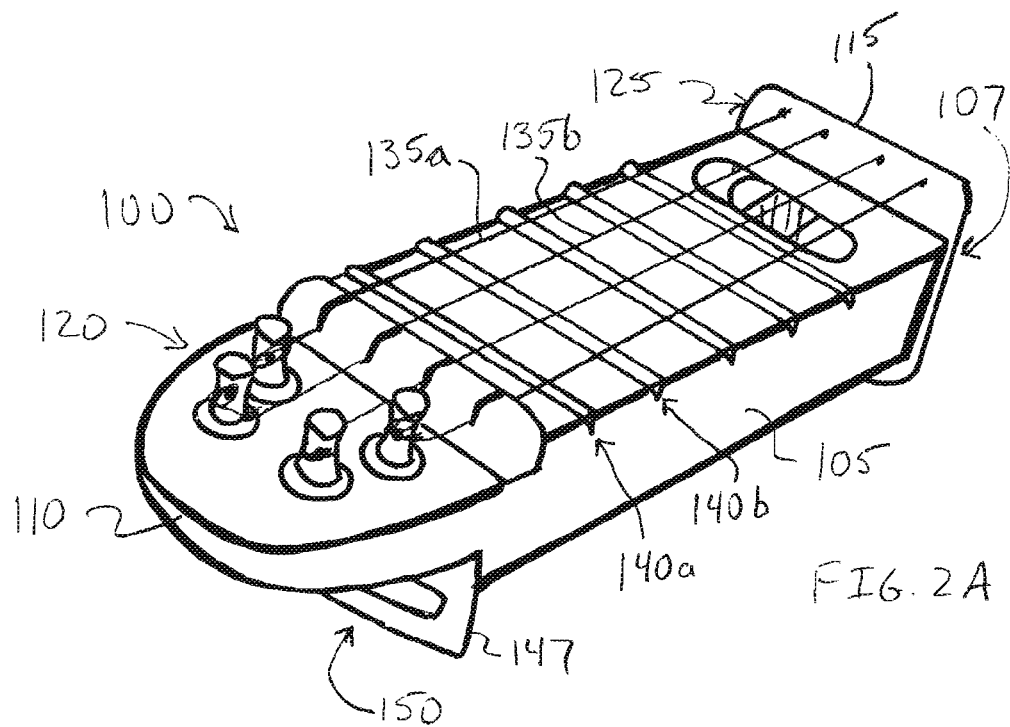
FIGS. 2A-2B illustrate a practice platform according to one embodiment.
Figure 2B:
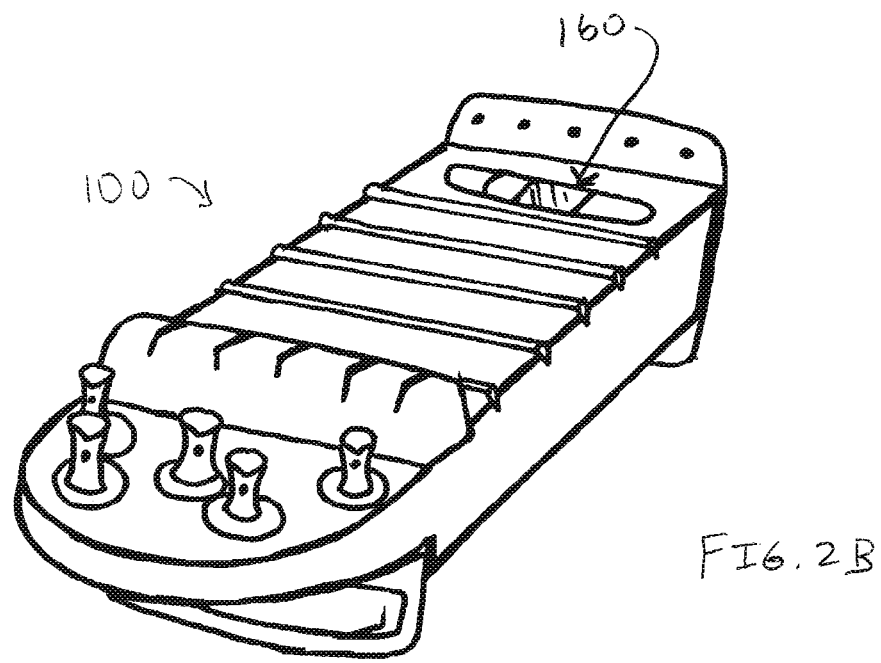

Referring now to FIGS. 2A and 2B, the practice platform 100 is illustrated in greater detail, according to one embodiment. In this embodiment, the platform 100 includes a platform body 105 (hereinafter 'body'). The body 105 can be made of any desired material, although certain materials may be selected to provide desired aesthetic, tonal, or other qualities. For example, in one embodiment, the body 105 can be composed of a type of wood to provide an aesthetic or tonal quality, while in another embodiment the body 105 can be composed of a synthetic material such as a molded plastic to provide longevity and resistance to degradation and wear. In any embodiment, the body 105 can be adorned with selected indicia, designs, decorations, or other markings as desired to provide, e.g., customized practice platforms.

In general, but without limitation, the size of the body 105 can be selected to be between about 0.75 times and about 2 times the width of an average human hand, e.g., from about six (6) inches in length to about nine (9) inches in length.

The platform 100 can be configured to resemble, in any desired shape, size, or dimension, the area of a selected stringed instrument that is played, e.g., strummed, picked, plucked, etc. In one non-limiting example, a platform 100 can closely mimic the area that a right-handed guitarist would normally play with his right hand, e.g., near the location of the 'sound hole' on an acoustic guitar. In another non-limiting example, the dimensions of the platform 100 can mimic the shape and size of a neck section of a selected stringed instrument, such as an eight-inch section of the neck of a guitar.

In this embodiment, the platform 100 includes a distal end 107 and a proximal end 110 as illustrated in FIG. 2A. In this embodiment, a bridge 115 is attached to the distal end 107 and can be secured thereto by fastening mechanisms or glues known in the art. In this embodiment, the bridge 115 includes four (4) apertures, although in other embodiments any desired number of apertures can be used. The apertures are configured to allow a string, cord, wire, or other material to be guided therethrough and secured, similar to bridges found on guitars.

In this embodiment, the proximal end 110 includes a plurality of tuning pegs (collective referred to in FIG. 2A using reference number 120) that are configured to receive one end of the string, cord, wire, or other material used in the practice platform 100. In this embodiment, the proximal end portion 110 of the platform is substantially U-shaped, although any other shape can be used according to preference or to produce a desired functional or aesthetic quality. FIG. 2B illustrates an alternative embodiment of the practice platform 100 which is configured to mimic a five-stringed instrument, e.g., a five-string guitar. In this embodiment, the platform 100 includes five tuning pegs that are arranged and configured to receive five strings (not shown). Accordingly, the bridge 115 in FIG. 2B includes five apertures, arranged and configured for the five strings.

In this embodiment, the platform 100 includes a plurality of strings, e.g., strings 135a, 135b (the other two strings in FIG. 2A are not labeled for figure clarity). In various embodiments, a platform 100 can include as many or as few strings as desired. For example, a platform 100 can include five strings to mimic a playing area of a five-string guitar; alternatively, a platform 100 can include four strings so as to mimic the playing area of a four-string banjo or other instrument. In general, a practice platform 100 can have as many strings as desired to mimic the playing area of a particular type of stringed instrument. "Strings" can be any type of material known in the art for the purpose of generating sounds, e.g., through vibration of the strings. Generally, as used herein, the "playing area" of an instrument refers to the area which a practitioner contacts the instrument with either hand, for example, the neck or the area near the sound hole of a guitar.

In this embodiment, each string is attached at one end to the bridge 115 and at the other end to a selected tuning peg, e.g., one of pegs 120, thereby providing the capability to control the tonal characteristics of each string by adjusting the string tension.

In this embodiment, the platform 100 includes a plurality of frets, e.g., frets 140a, 140b, etc. The frets can be arranged and spaced so as to mimic a fret on a selected stringed instrument such as a guitar or ukulele, for example.

Referring to FIGS. 2A-2B and 3A-3B, in this embodiment, the platform 100 includes a slotted plate 147 resiliently fastened to a bottom portion of the proximal end 110 as illustrated. The slotted plate 147 includes a slot 150, which, in this embodiment, is an aperture configured to receive a belt, fastening loop (not shown in FIGS. 2A-2B) or any other fastening device, to provide the capability of wearing the platform 100 on a person. FIGS. 1(A) and 1(B) illustrate such functionality. In this embodiment, a matching slot 116 is integral with the bridge 115, which is disposed on end opposite of the location of the apertures 125. In general, a practice platform 100 worn on the belt or other part of a person can provide easy access for a practitioner to gain a "feel" for a particular type of stringed instrument; similarly, a practitioner can practice picking, plucking, strumming, or any other hand or finger motions corresponding with stringed-instrument playing in places where it may be impractical to carry a full-sized instrument. For example, a practitioner can practice on a platform 100 in subways, on trains, while walking, standing in line, riding in a car, and other places, without limitation.

Referring now to FIGS. 4A and 4B, in this embodiment, the body 105 can be configured to house one or more electronic components. In this embodiment, the bottom surface 160 of the body 105 includes a chamber 163 configured to receive an electronic amplification system 170. In this embodiment, the amplification system 170 is an electronic "pick-up" that generates an electronic signal from the vibration of the platform strings and carries that signal to an outlet port 165. The outlet port can be any type of electrical connector suitable to transmit the amplified signal to an output device such as an amplifier, headphones, or other device. In embodiments where such electronic measures are used in the practice platform, the body 105 can be configured with apertures allowing sound propagation from the strings to the receiver of the electronic device as desired.

In general, the substantially-reduced size of a practice platform 100 provides increased mobility and allows a student to sharpen a variety of instrument-playing skills without the full-sized version of the instrument. For example, practitioners of the guitar, ukulele, banjo, and other stringed instruments that are typically "plucked" can practice plucking patterns or combinations on the platform 100 with the hand that they would normally pluck- or pick with. Similarly, students can practice strumming or any other technique related to the playing of their full-sized instrument. In some embodiments, the platform can be tuned to provide a musical instrument.

Figure 5B:
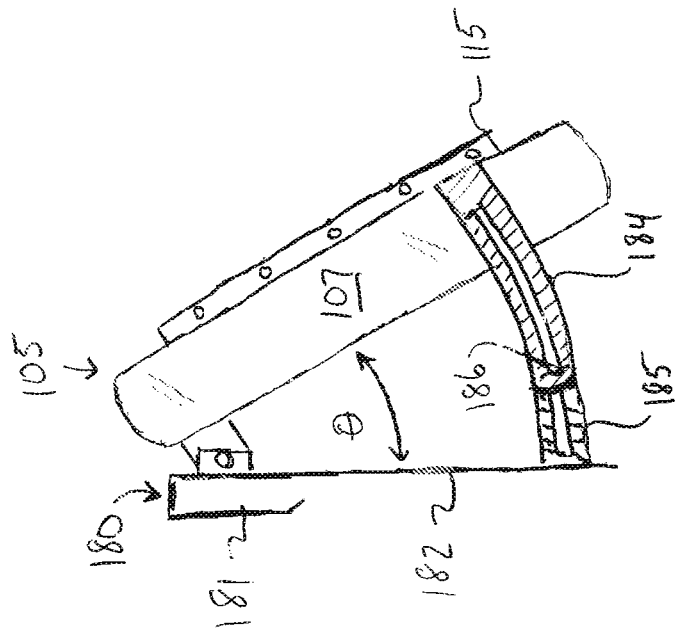
FIGS. 5A-5B illustrate a practice platform configured to pivot from a wearer's body, according to one embodiment.
Figure 5A:
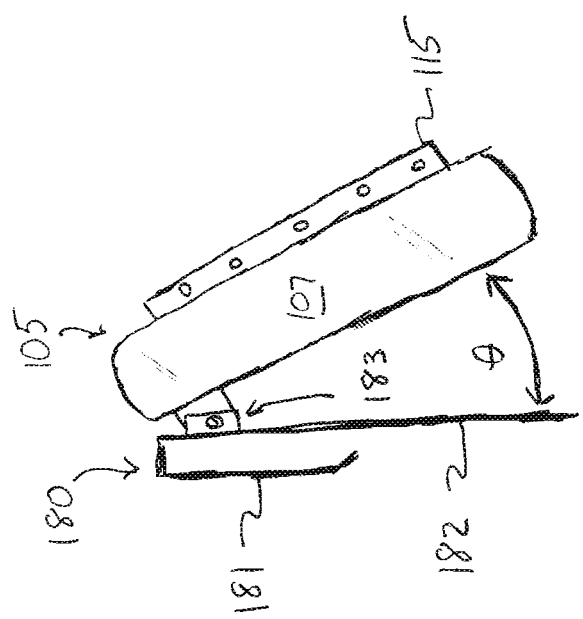

Referring now to FIGS. 5A-5B, in one embodiment, a practice platform can be hingedly coupled to a belt clip 180 to provide the practitioner the ability to pivot the platform body 105. FIGS. 5A-5B show a side elevation view of platform body 105 as viewed from the distal end 107. In this embodiment, the belt clip 180 includes a clip arm 181 and a clip platform body 182. The clip 180 is configured such that a belt can be placed between the clip arm 181 and clip platform body 182. The platform body 105 is hingedly coupled to the clip platform body 182 using a hinge member 183 which is configured to allow the practitioner to set a preferred angle between the clip platform body 182 and body 105 as illustrated by the double-headed arrow.

Referring now to FIG. 5B, in one alternative example, the clip platform body 182 and the platform body 105 can be locked into a desired angle. In this embodiment, a first arcuate arm member 185 is coupled to the clip platform body 182, and a second arcuate arm member 186 is coupled to the platform body 105. In this embodiment, the second arcuate arm member 186 is configured to shift over the first arm member 185, and a locking member 186 can be used to urge the first and second arm members 185, 186 into locking confrontation at a desired angle θ. Each of the first and second arm member 185, 186 includes an arcuate, elongate slot as illustrated to allow the angle θ to be set as desired.

A number of illustrative embodiments have been described. Nevertheless, it will be understood that various modifications may be made without departing from the spirit and scope of the various embodiments presented herein. For example, a practice platform 100 can include a cover member configured to fit over the body 105 to protect the instrument when not being played. Accordingly, other embodiments are within the scope of the following claims.

What is claimed is:

1. A practice system for a stringed instrument, comprising:
a rigid body having a proximal end unto which at least one tuning peg is disposed for attaching a first end of a cord, and a distal end unto which a first rigid plate is disposed having a first elongate slot and at least one aperture disposed therein, wherein said at least one aperture is configured for receiving a second end of said cord; and
a second rigid plate coupled to said proximal end having a second slot disposed therein that substantially matches the dimensions of said first elongate slot, wherein said first and said second slots are configured to receive a portion of a fastening device therethrough for wearing said practice system on a person.

2. The practice system of claim 1, wherein said rigid body has a length dimension less than about nine (9) inches.

3. The practice system of claim 2, wherein said rigid body has a width dimension less than about five (5) inches.

4. The practice system of claim 1, wherein said first and said second elongate slots are configured to receive a belt.

5. The practice system of claim 1 comprising four (4) of said tuning pegs, four (4) apertures in said first rigid plate, and one (1) of four (4) of said cords spanning each pair of said tuning peg and said aperture.

6. The practice system of claim 5, wherein each of said cords is capable of being tuned by a respective one of said tuning pegs to produce a desired note when played.

7. The practice system of claim 1, wherein said practice system is configured to allow a practitioner to tune said cord to a desired musical tone.

8. The practice system of claim 1, further comprising one or more frets disposed on said rigid body between said at least one tuning peg and said first rigid plate configured to allow a practitioner to change the tonal characteristic of said cord when played.

9. The practice system of claim 1, further comprising a recess in said rigid body for at least one electronic component configured to amplify sound originating from said cord when played.

10. The practice system of claim 9, wherein said electronic component is a pick-up amplifier.

11. The practice system of claim 9, further comprising at least one electronic component for transmitting said sound to an output jack.

12. The practice system of claim 11, wherein said output jack is configured to receive a headphone jack.

13. The practice system of claim 9, further comprising a recess in said rigid body for receiving a battery capable of powering said electronic component, and circuitry for connecting said battery to said electronic component.

\* \* \* \* \*